United States Patent
Shoji et al.

(10) Patent No.: US 11,105,903 B2
(45) Date of Patent: Aug. 31, 2021

(54) ELECTRONIC DISTANCE METER AND MODULATED FREQUENCY DETERMINATION METHOD OF FEEDBACK SIGNAL

(71) Applicant: TOPCON Corporation, Tokyo-to (JP)

(72) Inventors: Naoki Shoji, Tokyo-to (JP); Masae Matsumoto, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 528 days.

(21) Appl. No.: 16/127,834

(22) Filed: Sep. 11, 2018

(65) Prior Publication Data

US 2019/0120944 A1  Apr. 25, 2019

(30) Foreign Application Priority Data

Oct. 19, 2017  (JP) .............................. JP2017-202901

(51) Int. Cl.
  *G01C 3/08*  (2006.01)
  *G01S 7/4861*  (2020.01)
  (Continued)

(52) U.S. Cl.
  CPC .......... *G01S 7/4861* (2013.01); *G01S 7/4808* (2013.01); *G01S 7/4913* (2013.01); *G01S 7/4917* (2013.01);
  (Continued)

(58) Field of Classification Search
  CPC .... G01S 7/4861; G01S 7/4913; G01S 7/4808; G01S 7/4917; G01S 17/36; G01S 17/34; G01S 17/26
  See application file for complete search history.

(56) References Cited

U.S. PATENT DOCUMENTS 3,423,754 A  1/1969 Gunn
2008/0304043 A1  12/2008 Benz et al.
(Continued)

FOREIGN PATENT DOCUMENTS

JP  4330902 B2  9/2009
JP  0201921139 A  * 12/2019  ............. G01S 17/36

OTHER PUBLICATIONS

European communication dated Mar. 18, 2019 in corresponding European patent application No. 18194123.8.

*Primary Examiner* — Mark Hellner
(74) *Attorney, Agent, or Firm* — Nields, Lemack & Frame, LLC

(57) ABSTRACT

An electronic distance meter comprises a distance measuring light projecting module, a photodetector, a photodetection circuit, and a control arithmetic module, wherein the distance measuring light projecting module has a light emitter, the light emitter emits a distance measuring light, the photodetector receives a reflected distance measuring light from an object to be measured and produces photodetection signals, the photodetection circuit generates an intermediate frequency signal based on the photodetection signals, and the control arithmetic module controls the photodetection circuit and calculates a distance to the object to be measured based on each of the photodetection signals, and wherein the control arithmetic module coincides a frequency orthogonal to a frequency which a sampling signal has with a frequency of a feedback signal on a curve, which is acquired by performing a DFT processing on the sampling signal acquired by sampling the intermediate frequency signal.

4 Claims, 3 Drawing Sheets

(51) Int. Cl.
 *G01S 7/48* (2006.01)
 *G01S 17/36* (2006.01)
 *G01S 7/4913* (2020.01)
 *G01S 7/4912* (2020.01)
 *G01S 17/26* (2020.01)
 *G01S 17/34* (2020.01)

(52) U.S. Cl.
 CPC .............. *G01S 17/26* (2020.01); *G01S 17/34* (2020.01); *G01S 17/36* (2013.01)

(56) References Cited

U.S. PATENT DOCUMENTS

| | | |
|---|---|---|
| 2012/0013888 A1 | 1/2012 | Aoki |
| 2019/0033453 A1* | 1/2019 | Crouch ................ H04B 10/505 |
| 2019/0072672 A1* | 3/2019 | Yao ....................... G01S 17/931 |

* cited by examiner

ELECTRONIC DISTANCE METER AND MODULATED FREQUENCY DETERMINATION METHOD OF FEEDBACK SIGNAL

BACKGROUND OF THE INVENTION

The present invention relates to an electronic distance meter which irradiates a modulated distance measuring light to an object to be measured, receives a reflected distance measuring light from the object to be measured and measures a distance to the object to be measured by a phase difference between an internal reference light obtained by splitting the distance measuring light and the reflected distance measuring light, and a modulated frequency determination method of a feedback signal.

In an electronic distance meter, in order to perform a distance measurement with high accuracy, it is necessary to reduce a noise mixed into a distance measuring light to be irradiated.

As an electronic distance meter for measuring a distance to an object to be measured, there is a superheterodyne electronic distance meter which uses an intermediate frequency (IF).

A superheterodyne electronic distance meter is used in such a manner that a frequency difference between two signals is converted into an intermediate frequency and the converted intermediate frequency is amplified, and can perform a distance measurement using a distance measuring light which is modulated into a high frequency without using a complicated counter circuit, or the like.

However, in the superhetrodyne electronic distance meter, there is a case where, at a phase locked loop (PLL), a spurious emission (an unnecessary frequency component) of a frequency in a feedback signal as input to a comparator is mixed into the intermediate frequency.

In a case where the spurious emission of the feedback signal is mixed into the intermediate frequency, there is a possibility that a cyclic error which is one of noises in the distance measurement may occur, and an accuracy of the distance measurement may decrease.

SUMMARY OF THE INVENTION

It is an object of the present invention to provide an electronic distance meter and a modulated frequency determination method of a feedback signal which reduce an influence of a noise with respect to a distance measurement result and improve an accuracy of a distance measurement.

To attain the object as described above, an electronic distance meter according to the present invention comprises a distance measuring light projecting module, an optical path splitting component, a photodetector, a photodetection circuit, and a control arithmetic module, wherein the distance measuring light projecting module has a light emitter and a light emitter driving circuit, the light emitter emits a distance measuring light and the light emitter driving circuit outputs a predetermined signal to the light emitter so that the distance measuring light is burst-emitted at a predetermined frequency, the optical path splitting component splits a part of the distance measuring light as an internal reference light, the photodetector receives a reflected distance measuring light from an object to be measured and the internal reference light and produces photodetection signals respectively, the photodetection circuit generates an intermediate frequency signal based on the photodetection signals, and the control arithmetic module controls the photodetection circuit and calculates a distance to the object to be measured based on each of the photodetection signals, wherein the photodetection circuit has a reference signal generating module, a voltage controlled oscillator, an intermediate frequency signal generating module, a comparator, and a loop filter, the reference signal generating module outputs a reference signal of a predetermined frequency, the voltage controlled oscillator outputs a local signal and a feedback signal having frequencies according to a voltage of a signal to be input, the intermediate frequency signal generating module outputs the intermediate frequency signal based on the local signal and the photodetection signals, the comparator outputs a comparison signal based on a phase difference between the reference signal and the feedback signal, the loop filter outputs the comparison signal to the voltage controlled oscillator as a voltage signal, the voltage controlled oscillator synchronizes the feedback signal with the reference signal based on the comparison signal, and wherein the control arithmetic module coincides a frequency orthogonal to a frequency which a sampling signal has with a frequency of the feedback signal on a curve, which is acquired by performing a DFT processing on the sampling signal acquired by sampling the intermediate frequency signal.

Further, the electronic distance meter according to a preferred embodiment further comprises a first frequency divider and a second frequency divider, wherein the first frequency divider multiplies a frequency of the reference signal by one time of an integer, and the second frequency divider multiplies a frequency of the feedback signal by one time of an integer, and wherein the control arithmetic module sets frequency division ratios of the first frequency divider and the second frequency divider so that the frequency of the feedback signal to be input to the comparator coincides with the frequency orthogonal to the frequency which the sampling signal has.

Further, in the electronic distance meter according to a preferred embodiment, the control arithmetic module changes a period width of the sampling signal so that the frequency of the feedback signal coincides with the frequency orthogonal to the frequency which the sampling signal has.

Furthermore, in a modulated frequency determination method of a feedback signal according to the present invention, an electronic distance meter has a photodetection circuit, the photodetection circuit generates an intermediate frequency signal based on a local signal which is output from a voltage controlled oscillator and on a photodetection signal and produces an intermediate frequency signal, and the electronic distance meter measures a distance to an object to be measured based on a phase difference between an internal reference light by splitting a part of a distance measuring light and a reflected distance measuring light from the object to be measured, and wherein the electronic distance meter performs a DFT processing on a sampling signal acquired by sampling the intermediate frequency signal, and coincides a frequency orthogonal to a frequency which the sampling signal has with a frequency of a feedback signal on a curve acquired by the DFT processing.

According to the present invention, the electronic distance meter comprises a distance measuring light projecting module, an optical path splitting component, a photodetector, a photodetection circuit, and a control arithmetic module, wherein the distance measuring light projecting module has a light emitter and a light emitter driving circuit, the light emitter emits a distance measuring light and the light emitter driving circuit outputs a predetermined signal to the light emitter so that the distance measuring light is burst-emitted at a predetermined frequency, the optical path splitting component splits a part of the distance measuring light as an internal reference light, the photodetector receives a reflected distance measuring light from an object to be measured and the internal reference light and produces photodetection signals respectively, the photodetection circuit generates an intermediate frequency signal based on the photodetection signals, and the control arithmetic module controls the photodetection circuit and calculates a distance to the object to be measured based on each of the photodetection signals, wherein the photodetection circuit has a reference signal generating module, a voltage controlled oscillator, an intermediate frequency signal generating module, a comparator, and a loop filter, the reference signal generating module outputs a reference signal of a predetermined frequency, the voltage controlled oscillator outputs a local signal and a feedback signal having frequencies according to a voltage of a signal to be input, the intermediate frequency signal generating module outputs the intermediate frequency signal based on the local signal and the photodetection signals, the comparator outputs a comparison signal based on a phase difference between the reference signal and the feedback signal, the loop filter outputs the comparison signal to the voltage controlled oscillator as a voltage signal, the voltage controlled oscillator synchronizes the feedback signal with the reference signal based on the comparison signal, and wherein the control arithmetic module coincides a frequency orthogonal to a frequency which a sampling signal has with a frequency of the feedback signal on a curve, which is acquired by performing a DFT processing on the sampling signal acquired by sampling the intermediate frequency signal.

As a result, it is possible to remove an influence of a cyclic error due to a spurious emission existing in a frequency of the local signal from the distance measurement result.

Further, according to the present invention, in the modulated frequency determination method of a feedback signal, an electronic distance meter has a photodetection circuit, the photodetection circuit generates an intermediate frequency signal based on a local signal which is output from a voltage controlled oscillator and on a photodetection signal and produces an intermediate frequency signal, and the electronic distance meter measures a distance to an object to be measured based on a phase difference between an internal reference light by splitting a part of a distance measuring light and a reflected distance measuring light from the object to be measured, and wherein the electronic distance meter performs a DFT processing on a sampling signal acquired by sampling the intermediate frequency signal, and coincides a frequency orthogonal to a frequency which the sampling signal has with a frequency of a feedback signal on a curve acquired by the DFT processing. As a result, it is possible to remove the influence of the cyclic error due to the spurious emission existing in the frequency of the local signal from the distance measurement result.

BRIEF DESCRIPTION OF THE DRAWINGS

FIG. 3A is an explanatory drawing to show a case where a frequency to be input to a comparator is high, and FIG. 3B is an explanatory drawing to show a case where a frequency to be input to the comparator is low.

DETAILED DESCRIPTION OF THE PREFERRED EMBODIMENT

A description will be given below on embodiments of the present invention by referring to the attached drawings.

Figure 1:
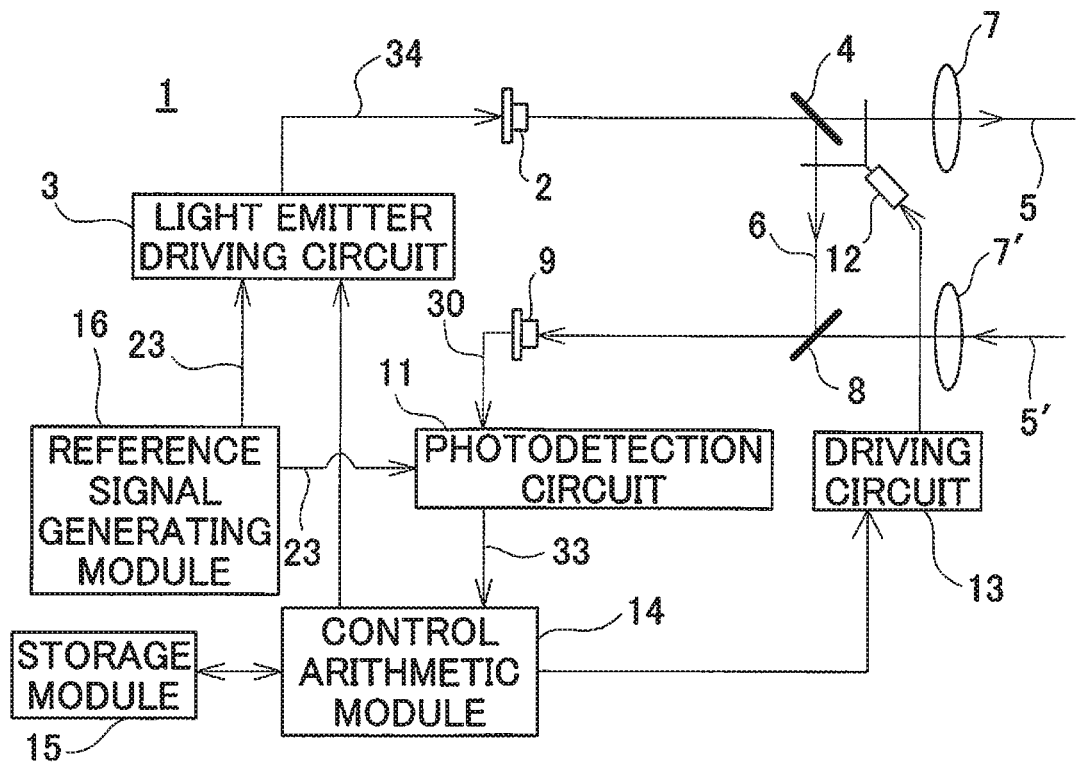
FIG. 1 is a block diagram to show a basic configuration of an electronic distance meter according to an embodiment of the present invention.

First, a description will be given on a basic configuration of an electronic distance meter 1 in FIG. 1.

A light emitter 2 (a laser diode: LD, for instance) is driven by a light emitter driving circuit 3 and emits a laser beam of which an intensity is modulated to a predetermined frequency. The laser beam is split by a half mirror 4 into a distance measuring light 5 and an internal reference light 6 by a predetermined ratio. The distance measuring light 5 as transmitted through the half mirror 4 is irradiated to an object to be measured (not shown) while being transmitted through an objective lens 7. A reflected distance measuring light 5' as reflected by the object to be measured is received by a photodetector 9 while being transmitted through the objective lens 7' and a half mirror 8. It is to be noted that, as the photodetector 9, a photodiode, for instance, an avalanche photodiode (APD) is used.

The light emitter 2, the light emitter driving circuit 3 and the like make up a distance measuring light projecting module, and the photodetector 9, a photodetection circuit 11 (to be described later) and the like make up a photodetection signal processing module. A reference signal generating module 16 outputs a reference signal 23 to the light emitter driving circuit 3 and the photodetection circuit 11.

The internal reference light 6 as reflected by the half mirror 4 is reflected by the half mirror 8 on an optical path of the reflected distance measuring light 5' and is received by the photodetector 9.

An optical path switching module 12 is provided across an optical path of the distance measuring light 5 and an optical path of the internal reference light 6. The optical path switching module 12 switches the optical path (that is, selects the distance measuring light 5 or the internal reference light 6) based on a signal from a driving circuit 13, and the reflected distance measuring light 5' and the internal reference light 6 are alternately received by the photodetector 9. The photodetection signal of the photodetector 9 is input to the photodetection circuit 11.

As the optical path switching module 12, a shutter for physically switching an optical path may be used, or a liquid crystal for electronically switching an optical path may be used.

The photodetection circuit 11 generates an intermediate frequency signal 33 (to be described later) while executing signal processings as required such as amplification and an A/D conversion of a photodetection signal 30 (to be described later) from the photodetector 9 and the like.

A control arithmetic module 14 is a CPU, for instance, or as the control arithmetic module 14, a PC or the like may be used. The control arithmetic module 14 controls the light emitter driving circuit 3 and controls a light emitting state of the light emitter 2 via the light emitter driving circuit 3. Further, the control arithmetic module 14 controls the driving circuit 13 and switches between the reflected distance measuring light 5' and the internal reference light 6 which enter the photodetector 9.

Further, the control arithmetic module 14 calculates a phase difference (photodetection time difference) between the internal reference light 6 and the reflected distance measuring light 5' based on the photodetection signal 30 and calculates a distance based on the photodetection time difference and a light velocity. Further, when the control arithmetic module 14 calculates the phase difference between the internal reference light 6 and the reflected distance measuring light 5', unstable factors on the circuit such as a drift of the photodetection circuit 11 and the like are removed. Further, the control arithmetic module 14 performs a predetermined processing such as a discrete Fourier transform (DFT) processing or the like based on the intermediate frequency signal 33.

The control arithmetic module 14 executes various programs stored in a storage module 15, performs a control of the light emitter driving circuit 3, a control of the light emitting state of the light emitter 2, a control of the driving circuit 13 and the like and further, executes required calculations as required for a distance measurement.

It is to be noted that, as the storage module 15, an HDD, a semiconductor memory, a memory card, or the like is used.

Further, the control arithmetic module 14 controls the light emitter 2 so that the light emitter 2 intermittently emits (burst-emits) via the light emitter driving circuit 3.

In the storage module 15, programs required for the control and various programs for calculations required for the distance measurement are stored. These programs include, for instance, a signal processing program for executing a signal processing such as an amplification, an A/D conversion and the like of a signal as output from the photodetection circuit 11, a calculation program for sampling the intermediate frequency signal 33 as output from the photodetection circuit 11 and executing the DFT processing with respect to a sampled burst waveform, a calculation program for determining a frequency of a light emitting processing signal 34 to make the light emitter 2 emit at a desired frequency, or the like. Further, in the storage module 15, various data such as a distance measurement result, a calculation result and the like are stored.

Figure 2:
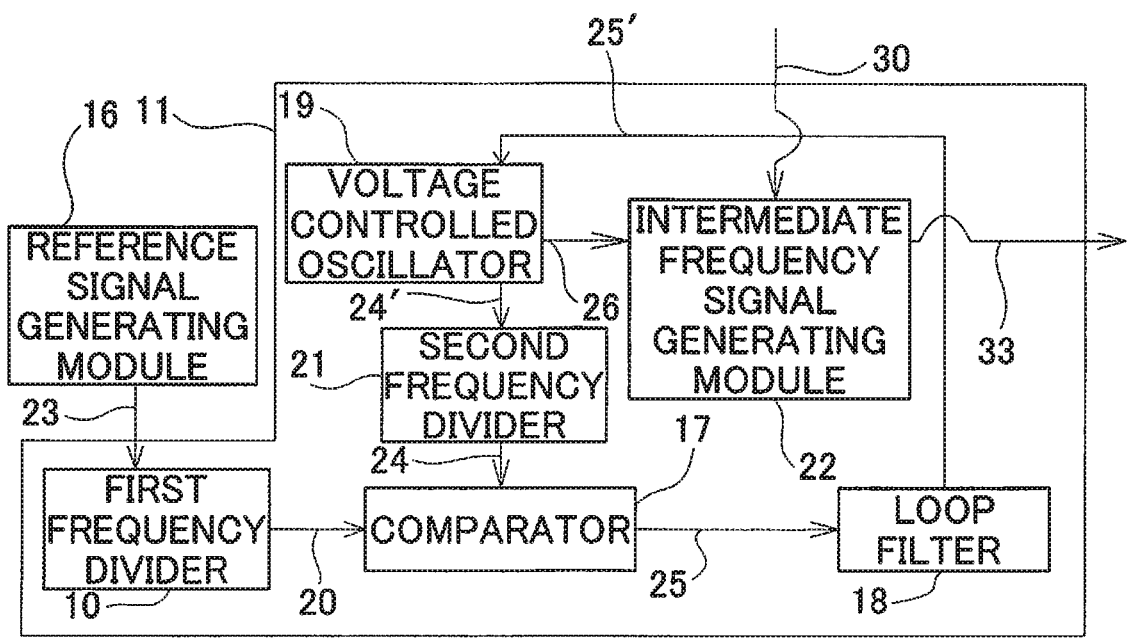
FIG. 2 is a block diagram to show a photodetection circuit in the electronic distance meter.

FIG. 2 shows a schematical block diagram of the photodetection circuit 11 according to an embodiment of the present invention. It is to be noted that the reference signal generating module 16 may be included in the photodetection circuit 11.

The photodetection circuit 11 comprises a first frequency divider 10, a comparator 17, a loop filter 18, a voltage controlled oscillator (VCO) 19, a second frequency divider 21 and an intermediate frequency signal generating module 22. To the photodetection circuit 11, the reference signal 23 from the reference signal generating module 16 is input. Further, the photodetection circuit 11 makes up a phase locked loop (PLL).

The reference signal generating module 16, for instance, outputs the reference signal 23 of 30 MHz. Further, the voltage controlled oscillator 19 outputs a signal of a frequency (local frequency) corresponding to a voltage of an input signal. The voltage controlled oscillator 19, for instance, produces a local signal 26 of 120 MHz and outputs a feedback signal (FD signal) 24' of a frequency having a similar frequency to the local signal 26.

The reference signal 23 as produced from the reference signal generating module 16 is input to the comparator 17 as a first frequency divided signal 20 via the first frequency divider 10. Further, the feedback signal 24' as produced from the voltage controlled oscillator 19 is input to the comparator 17 as a feedback signal 24 via the second frequency divider 21.

The first frequency divider 10 can arbitrarily change a frequency division ratio and multiplies a frequency of the reference signal 23 from the reference signal generating module 16 by 1/m ("m" is an integer). That is, the first frequency divided signal 20 is a signal of a frequency acquired by multiplying the frequency of the reference signal 23 by 1/m.

Further, the second frequency divider 21 can arbitrarily change a frequency division ratio and multiplies a frequency of the feedback signal 24' from the voltage controlled oscillator 19 by 1/n ("n" is an integer). That is, the feedback signal 24 is a signal of a frequency acquired by multiplying the frequency of the feedback signal 24' by 1/n.

In the phase locked loop, two signals having the same frequency are input to the comparator 17, and a phase difference between the two signals is obtained by the comparator 17. In the present embodiment, a frequency of the first frequency divided signal 20 becomes equal to a frequency of the feedback signal 24. Here, the frequency of the reference signal 23 is 30 MHz, and in a case where it is desired to set a local frequency of the local signal 26 at 120 MHz and set the frequency of the first frequency divided signal 20 at 5 MHz, m=6 and n=24.

It is to be noted that a spurious frequency (to be described later) is determined by a frequency of a signal to be input to the comparator 17. Therefore, by changing the frequency division ratio of the first frequency divider 10 and the second frequency divider 21, it is possible to control the spurious frequency.

On the other hand, a phase shift occurs between the first frequency divided signal 20 and the feedback signal 24. The comparator 17 compares a phase of the first frequency divided signal 20 with a phase of the feedback signal 24 and outputs a shift (a phase difference) between the first frequency divided signal 20 and the feedback signal 24 as a comparison signal 25. A frequency of the comparison signal 25 is equal to frequencies of the first frequency divided signal 20 and the feedback signal 24, and is, for instance, 5 MHz.

The comparison signal 25 is input to the loop filter 18. The loop filter 18 is, for instance, a lowpass filter, and removes an AC component from the comparison signal 25. Further, the loop filter 18 converts a phase difference into a DC voltage signal and feeds back the DC voltage signal to the voltage controlled oscillator 19 as a comparison signal 25'.

The voltage controlled oscillator 19 outputs the feedback signal 24' and the local signal 26 so that a frequency difference between the first frequency divided signal 20 and the feedback signal 24 becomes 0 based on a voltage of the comparison signal 25' as input from the loop filter 18. Therefore, from the voltage controlled oscillator 19, the local signal 26, of which phase is synchronized at a frequency of n times as high as a frequency of the first frequency divided signal 20 as produced from the first frequency divider 10, is output to the intermediate frequency signal generating module 22.

The intermediate frequency signal generating module 22 outputs the intermediate frequency signal 33 having an intermediate frequency (fIF) to the control arithmetic module 14 based on the local signal 26 and the photodetection signal 30 as input from the photodetector 9. It is to be noted that, in a case where a frequency of the local signal 26 is set at 120 MHz, and a frequency of the photodetection signal 30 is set at 120+7.5 MHz, a frequency (intermediate frequency) of the intermediate frequency signal 33 becomes 7.5 MHz.

Here, in a case where the distance measurement is performed by the electronic distance meter 1, first, the light emitter 2 is driven by the control arithmetic module 14, and further, the light emitter 2 burst-emits the distance measuring light 5. It is to be noted that, in the present embodiment, the distance measuring light 5 is burst-emitted in a burst cycle of 10 μsec (100 KHz) and at a burst period width of 1 μsec (1 MHz).

The control arithmetic module 14 samples the intermediate frequency signal 33 as generated in the photodetection circuit 11 by a predetermined period width based on either one of a photodetection signal of the reflected distance measuring light 5' as received by the photodetector 9 or a photodetection signal of the internal reference light 6. Further, the control arithmetic module 14 performs a DFT processing with respect to the sampled intermediate frequency signal 33 (sampling signal).

Further, the control arithmetic module 14 performs the DFT processing with respect to the intermediate frequency signal 33 and obtains a phase difference between the reflected distance measuring light 5' and the internal reference light 6 among frequencies as acquired in a case where phases are obtained, and calculates a distance to the object to be measured based on the phase difference.

Figure 3A:
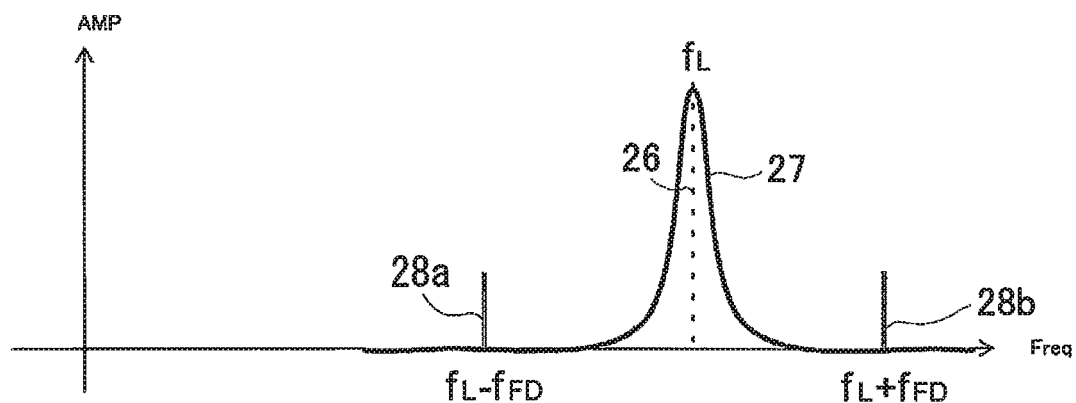
FIG. 3A and FIG. 3B are drawings in which spectra of a local signal as output from a voltage controlled oscillator in FIG. 2 are measured.
Figure 3B:
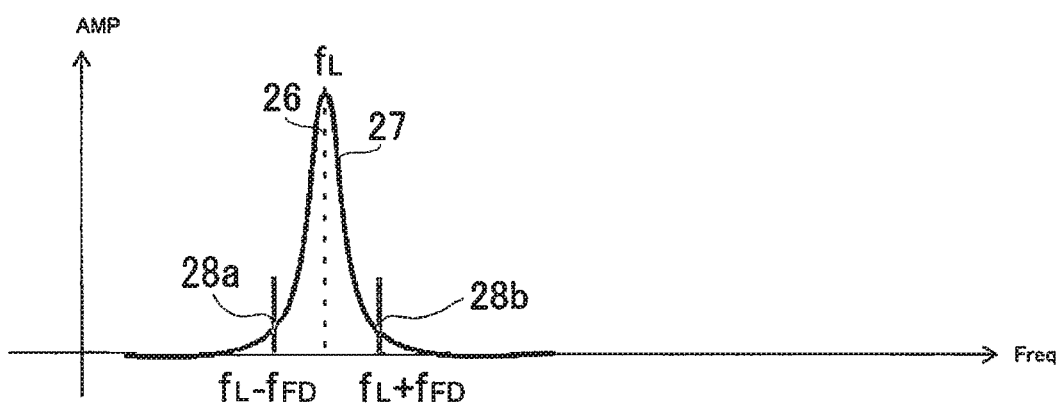

FIG. 3A and FIG. 3B are graphs to show a relationship between the local signal 26 and spurious emissions 28a and 28b (unnecessary frequency components) of the comparison signal 25. It is to be noted that FIG. 3A shows a case where a feedback frequency (±fFD) of the feedback signal 24 to be input to the comparator 17 is set high, and FIG. 3B shows a case where the feedback frequency is set low.

As shown in FIG. 3A and FIG. 3B, the spurious emissions 28a and 28b occur at positions away from a local frequency (fL) of the local signal 26 by the feedback frequency (±fFD) of the feedback signal 24. For instance, in a case where the local frequency is set at 120 MHz and the feedback frequency is set at 5 MHz, the spurious emissions 28a and 28b occur at positions of 120±5 MHz.

In a case where the intermediate frequency is set at 7.5 MHz, the spurious emission 28a occurs at a position of 5 MHz.

Further, as shown in FIG. 3A and FIG. 3B, in a case where the feedback frequency of the feedback signal 24 to be input to the comparator 17 is high, the spurious emissions 28a and 28b occur at positions far from the local frequency, and in a case where the feedback frequency is low, the spurious emissions 28a and 28b occur at positions close to the local frequency.

In a case where the feedback frequency is appropriate, as shown in FIG. 3A, the spurious emissions 28a and 28b occur outside a signal region (a width of the graph) 27 of the local signal 26. On the other hand, in a case where the feedback frequency is not appropriate, as shown in FIG. 3B, the spurious emissions 28a and 28b exist inside the signal region 27. For this reason, the spurious emissions 28a and 28b greatly affect a DFT processing result as a cyclic error.

If the spurious emissions 28a and 28b affect the DFT processing result as the cyclic error, the cyclic error is mixed into a distance measurement result, which results in a decrease of an accuracy of the distance measurement.

A description will be given below on a method for determining the feedback frequency such that the cyclic error does not affect the distance measurement result by using FIG. 4A and FIG. 4B.

Figure 4A:
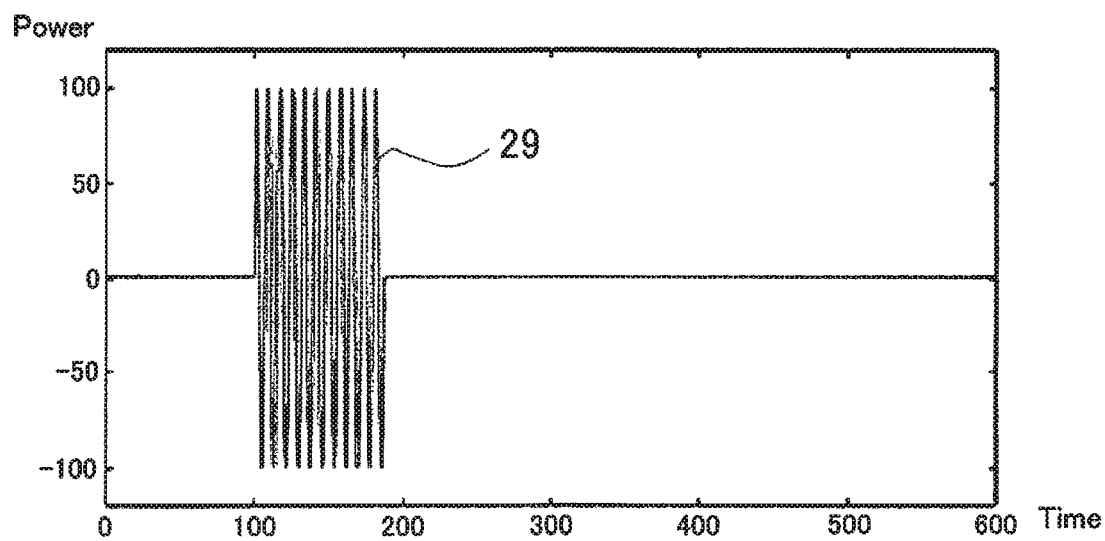
FIG. 4A is a graph to show a sampling signal acquired by sampling an intermediate frequency signal.
Figure 4B:
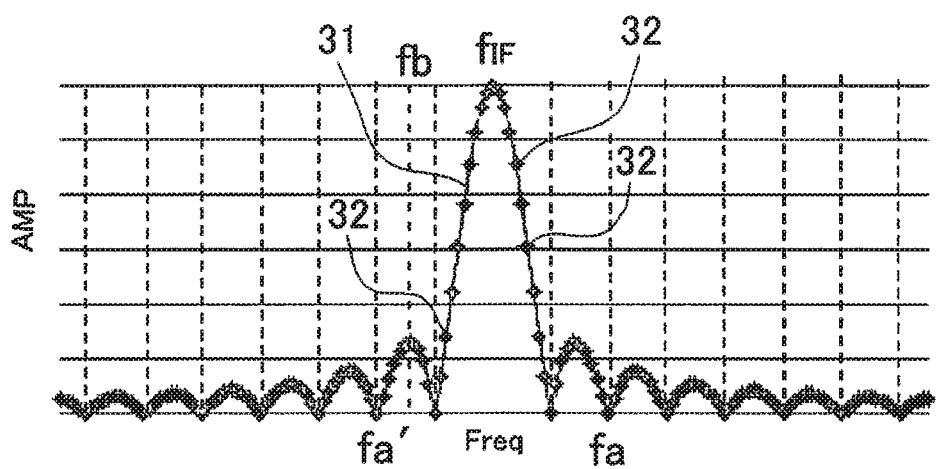
FIG. 4B is a graph to show a curve acquired by performing a DFT processing on the sampling signal.

FIG. 4A shows a sampling example of the intermediate frequency signal 33 having the intermediate frequency (fIF).

It is to be noted that, in FIG. 4A, in the intermediate frequency signal 33, a burst waveform 29 of 10 μsec (100 KHz) is performed to a sampling processing, and a sampling signal 32 is acquired. Further, FIG. 4B shows a frequency distribution curve (hereinafter, a curve 31) acquired by performing the DFT processing with respect to the sampling signal 32.

The curve 31 is acquired by connecting amplitudes at each frequency acquired by the DFT processing at a line. The curve 31 has a waveform shape in which an output of the curve 31 becomes 0 at a frequency orthogonal to a frequency which the sampling signal 32 has. Here, the frequency orthogonal to the frequency which the sampling signal 32 has indicates a frequency which does not have a correlation with a frequency which the sampling signal 32 has (becomes 0), that is, a frequency at which an integral value of two frequencies becomes 0 in a predetermined period.

As described above, on the curve 31, the frequency orthogonal to the frequency which the sampling signal 32 has is a frequency which becomes 0 as a result of a calculation. That is, the orthogonal frequency is a frequency which does not affect a calculation result of the distance measurement. It is to be noted that an interval of the adjacent orthogonal frequencies is equal to a frequency corresponding to one cycle of the burst waveform 29.

In a case where the feedback frequency (fFD) coincides with the frequency orthogonal to the frequency which the sampling signal 32 has (for instance, a point of a frequency fa in FIG. 4B), the spurious emissions 28a and 28b occur at the orthogonal frequency. For this reason, a cyclic error due to the spurious emissions 28a and 28b does not affect the calculation result of the distance measurement.

On the other hand, in a case where the feedback frequency (fFD) is a frequency which is not orthogonal to the frequency which the sampling signal 32 has (for instance, a point of a frequency fb in FIG. 4B), the spurious emissions 28a and 28b occur at the frequency which is not orthogonal, that is, a frequency which does not become 0 as a result of a calculation. For this reason, a cyclic error due to the spurious emissions 28a and 28b affects the calculation result of the distance measurement.

Therefore, the feedback frequency is set so that the frequencies fa and fa' orthogonal to the frequency which the sampling signal 32 has (frequencies at which the output becomes 0 on the curve 31) coincide with the feedback frequency (fFD), and the spurious emissions 28a and 28b are made to occur at the orthogonal frequencies. Thereby, it is possible to prevent an influence of a cyclic error due to spurious emissions existing at the frequencies fa and fa' with respect to the distance measurement result.

The control arithmetic module 14 sets a frequency division ratio of the first frequency divider 10 and a frequency division ratio of the second frequency divider 21 so that the feedback frequency becomes a determined frequency. It is to be noted that, in a case where there are a plurality of frequencies which satisfy conditions, the frequencies are determined as candidates for the feedback frequency.

Therefore, it is possible to remove a cyclic error which is one of noises of when the distance measurement is performed from the distance measurement result, and it is possible to improve the accuracy of the distance measurement of the electronic distance meter 1.

It is to be noted that, in the present embodiment, the control arithmetic module 14 sets the frequency division ratio of the first frequency divider 10 and the frequency division ratio of the second frequency divider 21 and adjusts positions where the spurious emissions 28a and 28b occur so that the spurious emissions 28a and 28b occur at the frequency orthogonal to the frequency which the sampling signal 32 has (a position where the output of the curve 31 becomes 0). Thereby, an influence of a cyclic error with respect to the calculation result of the distance measurement is prevented.

On the other hand, it may be so configured to fix the positions where the spurious emissions 28a and 28b occur, adjust a waveform shape of the curve 31 (the orthogonal frequency) and occur the spurious emissions 28a and 28b at positions where the output of the curve 31 becomes 0.

The waveform shape of the curve 31 is determined by the intermediate frequency, a burst cycle, a burst period, or the like. Further, the waveform shape of the curve 31 changes also by a period width of the intermediate frequency signal 33 which is to be performed to the sampling processing by the control arithmetic module 14.

As described above, by adjusting the period width of the intermediate frequency signal 33 to be sampled by the control arithmetic module 14, it is possible to change the waveform shape of the curve 31, that is, the frequency orthogonal to the frequency which the sampling signal 32 has.

Therefore, even in a case where frequencies of the first frequency divided signal 20 and the local signal 26 are fixed, in a case where it turns out that the spurious emissions 28a and 28b occur at the frequency which is not orthogonal to the frequency which the sampling signal 32 has after a circuit assembling, or the like, it is possible to coincide the frequency orthogonal to the frequency which the sampling signal 32 has with the feedback frequency. For this reason, it is possible to make the spurious emissions 28a and 28b occur at the frequency orthogonal to the frequency which the sampling signal 32 has, and it is possible to prevent the influence of the cyclic error with respect to the calculation result of the distance measurement.

The invention claimed is:

1. An electronic distance meter comprising: a distance measuring light projecting module, an optical path splitting component, a photodetector, a photodetection circuit, and a control arithmetic module, wherein said distance measuring light projecting module has a light emitter and a light emitter driving circuit, said light emitter emits a distance measuring light and said light emitter driving circuit outputs a predetermined signal to said light emitter so that said distance measuring light is burst-emitted at a predetermined frequency, said optical path splitting component splits a part of said distance measuring light as an internal reference light, said photodetector receives a reflected distance measuring light from an object to be measured and said internal reference light and produces photodetection signals respectively, said photodetection circuit generates an intermediate frequency signal based on said photodetection signals, and said control arithmetic module controls said photodetection circuit and calculates a distance to said object to be measured based on each of said photodetection signals, wherein said photodetection circuit has a reference signal generating module, a voltage controlled oscillator, an intermediate frequency signal generating module, a comparator, and a loop filter, said reference signal generating module outputs a reference signal of a predetermined frequency, said voltage controlled oscillator outputs a local signal and a feedback signal having frequencies according to a voltage of a signal to be input, said intermediate frequency signal generating module outputs said intermediate frequency signal based on said local signal and said photodetection signals, said comparator outputs a comparison signal based on a phase difference between said reference signal and said feedback signal, said loop filter outputs said comparison signal to said voltage controlled oscillator as a voltage signal, said voltage controlled oscillator synchronizes said feedback signal with said reference signal based on said comparison signal, and wherein said control arithmetic module creates a frequency orthogonal to a frequency which a sampling signal has, which coincides with a frequency of said feedback signal on a curve, which is acquired by performing a DFT processing on said sampling signal acquired by sampling said intermediate frequency signal.

2. The electronic distance meter according to claim 1, further comprising: a first frequency divider and a second frequency divider, wherein said first frequency divider multiplies a frequency of said reference signal by one time of an integer, and said second frequency divider multiplies a frequency of said feedback signal by one time of an integer, and wherein said control arithmetic module sets frequency division ratios of said first frequency divider and said second frequency divider so that the frequency of said feedback signal to be input to said comparator coincides with the frequency orthogonal to the frequency which said sampling signal has.

3. The electronic distance meter according to claim 1, wherein said control arithmetic module changes a period width of said sampling signal so that the frequency of said feedback signal coincides with the frequency orthogonal to the frequency which said sampling signal has.

4. A method of determining a modulated frequency of a feedback signal, wherein an electronic distance meter has a photodetection circuit, said photodetection circuit generates an intermediate frequency signal based on a local signal which is output from a voltage controlled oscillator and on a photodetection signal and produces an intermediate frequency signal, and said electronic distance meter measures a distance to an object to be measured based on a phase difference between an internal reference light by splitting a part of a distance measuring light and a reflected distance measuring light from said object to be measured, and wherein said electronic distance meter performs a DFT processing on a sampling signal acquired by sampling said intermediate frequency signal, and creates a frequency orthogonal to a frequency which said sampling signal has, which coincides with a frequency of a feedback signal on a curve acquired by the DFT processing.

\* \* \* \* \*